US006952421B1

(12) United States Patent
Slater

(10) Patent No.: US 6,952,421 B1
(45) Date of Patent: Oct. 4, 2005

(54) SWITCHED ETHERNET PATH DETECTION

(75) Inventor: Charles Slater, Sunnyvale, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 09/414,996

(22) Filed: Oct. 7, 1999

(51) Int. Cl.$^7$ .......................... H04L 12/28; H04L 12/56
(52) U.S. Cl. ....................... 370/401; 370/402; 370/404
(58) Field of Search ................................ 370/401, 402, 370/404, 351, 389, 464, 392, 254, 255, 257, 258, 393; 709/236, 238, 239, 240, 241, 242, 243, 244

(56) References Cited

U.S. PATENT DOCUMENTS

| 4,365,331 | A | * | 12/1982 | Biba et al. ................... 370/445 |
| 4,939,728 | A | * | 7/1990 | Markkula, Jr. et al. ...... 370/419 |
| 5,136,580 | A | | 8/1992 | Videlock et al. .............. 370/60 |
| 5,150,464 | A | * | 9/1992 | Sidhu et al. .................. 709/222 |
| 5,224,099 | A | | 6/1993 | Corbalis et al. ............. 370/94.2 |
| 5,251,205 | A | * | 10/1993 | Callon et al. ................ 370/392 |
| 5,274,631 | A | | 12/1993 | Bhardwaj .................... 370/60 |
| 5,282,270 | A | * | 1/1994 | Oppenheimer et al. ..... 709/223 |
| 5,309,433 | A | * | 5/1994 | Cidon et al. ................ 370/390 |
| 5,345,446 | A | | 9/1994 | Hiller et al. ................ 370/60.1 |
| 5,361,256 | A | | 11/1994 | Doeringer et al. ............ 370/60 |
| 5,365,524 | A | | 11/1994 | Hiller et al. .................. 370/94 |
| 5,367,635 | A | | 11/1994 | Bauer et al. ................. 395/200 |
| 5,383,179 | A | * | 1/1995 | Saini et al. .................. 370/393 |
| 5,388,213 | A | * | 2/1995 | Oppenheimer et al. ..... 709/245 |
| 5,473,599 | A | | 12/1995 | Li et al. ...................... 370/16 |
| 5,473,607 | A | | 12/1995 | Hausman et al. .......... 370/85.13 |
| 5,502,725 | A | | 3/1996 | Pohjakallio ................ 370/94.1 |

(Continued)

FOREIGN PATENT DOCUMENTS

| EP | 0 567 217 | 10/1993 | ........... H04L/12/46 |
| JP | 07099490 A | * 4/1995 | ........... H04L/12/00 |

OTHER PUBLICATIONS

Cisco Systems, Inc., "Configuration and Management", printed from http://www/cisco.com/univercd/cc/td/doc/product/lan/28201900/1928v67x/19icg67x/19icoutb.htm, on May 27, 1999, 62 pages.
Cisco Systems, Inc., "LAN Switching", printed from http://www.cisco.com/univercd/cc/td/doc/cisntwk/ics/cs010.htm, on May 27, 1999, 6 pages.
Cisco Systems, Inc., "Web–Based Management", printed from http://ww.cisco.com/univercd/cc/td/doc/product/lan/c2900xl/c2900sa3/sa3icg/mainstal. htm#11811, on May 28, 1999, 44 pages.

Primary Examiner—Wellington Chin
Assistant Examiner—Jamal A. Fox
(74) Attorney, Agent, or Firm—Thelen Reid & Priest LLP; David B. Ritchie

(57) ABSTRACT

A method and apparatus for discovering paths to other network devices includes a protocol and network management application that can be executed on network devices. The Ethernet protocol is used to detects paths to other network devices, knowing only the Ethernet address of the destination. A discovery protocol is extended to add hop probe and hop probe reply Type-Length-Value fields in a variable-length list. The hop probe fields contain a hop count, a destination Ethernet address, and a source Ethernet address. When a hop probe is received by a network device, the hop count field is decremented by one and the hop probe is forwarded. Packet received with a hop count of one are not forwarded and a hop probe reply is sent back to the Ethernet source address of the hop probe. The hop probe reply fields contain a destination Etherned address and a source Ethernet address.

118 Claims, 9 Drawing Sheets

U.S. PATENT DOCUMENTS

| | | | | |
|---|---|---|---|---|
| 5,515,376 A | * | 5/1996 | Murthy et al. | 370/402 |
| 5,561,669 A | | 10/1996 | Lenney et al. | 370/60.1 |
| 5,570,360 A | | 10/1996 | Klausmeier et al. | 370/60 |
| 5,583,862 A | | 12/1996 | Callon | 370/397 |
| 5,610,905 A | * | 3/1997 | Murthy et al. | 370/401 |
| 5,678,006 A | | 10/1997 | Valizadeh et al. | 395/200.02 |
| 5,712,981 A | * | 1/1998 | McKee et al. | 709/241 |
| 5,734,654 A | | 3/1998 | Shirai et al. | 370/396 |
| 5,740,171 A | | 4/1998 | Mazzola et al. | 370/392 |
| 5,751,710 A | | 5/1998 | Crowther et al. | 370/423 |
| 5,796,732 A | | 8/1998 | Mazzola et al. | 370/362 |
| 5,802,042 A | | 9/1998 | Natarajan et al. | 370/255 |
| 5,802,047 A | | 9/1998 | Kinoshita | 370/259 |
| 5,802,054 A | * | 9/1998 | Bellenger | 370/401 |
| 5,835,720 A | * | 11/1998 | Nelson et al. | 709/224 |
| 5,848,242 A | * | 12/1998 | Behaghel et al. | 709/218 |
| 5,854,901 A | | 12/1998 | Cole et al. | 395/200.75 |
| 5,867,666 A | | 2/1999 | Harvey | 395/200.68 |
| 5,872,783 A | | 2/1999 | Chin | 370/392 |
| 5,918,016 A | | 6/1999 | Brewer et al. | 395/200.5 |
| 5,926,101 A | * | 7/1999 | Dasgupta | 340/825.02 |
| 5,949,786 A | * | 9/1999 | Bellenger | 370/401 |
| 5,959,990 A | | 9/1999 | Frantz et al. | 370/392 |
| 5,964,841 A | * | 10/1999 | Rekhter | 709/242 |
| 5,991,810 A | | 11/1999 | Shapiro et al. | 709/229 |
| 6,018,770 A | | 1/2000 | Little et al. | 709/223 |
| 6,047,376 A | | 4/2000 | Hosoe | 713/201 |
| 6,055,236 A | | 4/2000 | Nessett et al. | 370/389 |
| 6,055,561 A | * | 4/2000 | Feldman et al. | 709/200 |
| 6,092,196 A | | 7/2000 | Reiche | 713/200 |
| 6,256,306 B1 | * | 7/2001 | Bellenger | 370/389 |
| 6,377,987 B1 | * | 4/2002 | Kracht | 709/220 |
| 6,545,982 B1 | * | 4/2003 | Murthy et al. | 370/245 |
| 6,570,875 B1 | * | 5/2003 | Hegde | 370/389 |
| 6,772,219 B1 | * | 8/2004 | Shobatake | 709/238 |

* cited by examiner

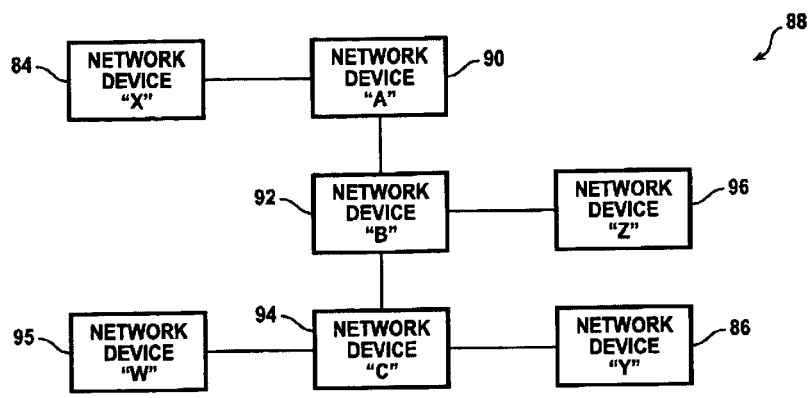

FIG. 6

```
Switch# show cdp neighbors
Capability Codes:  R - Switch,  T - Trans Bridge,  B - Source Route Bridge
                   S - Switch,  H - Host,  I - IGMP Device ID            Local Intrfce    Holdtme   Capability   Platform   Port ID
device.domain.com    Eth 0            151       R T          AGS        Eth 0
device.domain.com    Ser 0            165       R T          AGS        Ser 3
```

FIG. 7

```
Console> (enable) show cdp neighbor 4
Capability Codes:  R - Router,  T - Trans Bridge,  B - Source Route Bridge
                   S - Switch,  H - Host,  I - IGMP,  r - Repeater Port    Device-ID              Port-ID      Platform          Capability
------  ---------------------  -----------  ----------------  ----------
4/1     001905905              4/1          WS-C5000          T S
4/1     062000101(CAT3)        9            WS-C1201          S I
4/1     069000022              8/1          WS-C5500          T S
4/1     069000040              4/2          WS-C5500          T S
Console> (enable)
```

FIG. 8

```
router# show cdp neighbors detail

Device ID: 0080024 1EEB00 (milan-sw-1-cat9k)
Entry address(es):
                IP address: 1.15.28.10
Platform: CAT5000, Capabilities: Switch
Interface: Ethernet1/0, Port ID (outgoing port): 2/7
Holdtime : 162 sec Version :
Cisco Catalyst 5000
Duplex Mode: full
Native VLAN: 42
VTP Management Domain: 'Accounting Group'
```

*FIG. 9*

```
Console> (enable) show mac dynamic
Non-static Address Table:
```

| Destination Address | Address Type | VLAN | Destination Port |
|---|---|---|---|
| 0000.0c07.ac00 | Dynamic | 3 | FastEthernet0/1 |
| 0010.7b3b.2c82 | Dynamic | 3 | FastEthernet0/1 |
| 0060.5cf4.0076 | Dynamic | 3 | FastEthernet0/1 |
| 0060.b0c3.94ef | Dynamic | 3 | FastEthernet0/1 |
| 0090.0c71.a7fb | Dynamic | 3 | FastEthernet0/1 |
| 00d0.067c.e441 | Dynamic | 3 | FastEthernet0/4 |

*FIG. 11B*

```
Console> (enable) show mac static

Static Address Table:
```

| Destination Address | VLAN | Input Port | Output Ports |
|---|---|---|---|
| 0100.5e00.0128 | 3 | Fa0/1 | |
|  | 3 | Fa0/4 | Fa0/1 |
|  | 3 | Fa0/6 | Fa0/1 |

*FIG. 11C*

```
Console> (enable) show cdp neighbor 4 detail
Device-ID: 001905905
Device Addresses:
   IP Address: 172.16.25.140
Holdtime: 168 sec
Capabilities: TRANSPARENT_BRIDGE SWITCH
Version:
   WS-C5000 Software, Version McpSW: 2.2(4) NmpSW: 2.3(103-Eng)
   Copyright (c) 1995,1996 by Cisco Systems
Platform: WS-C5000
Port-ID (Port on Device): 4/1
Port (Our Port): 4/1
----------------------------------------------------------------------
Device-ID: 062000101(CAT3)
Device Addresses:
   IP Address: 172.16.25.212
Holdtime: 175 sec
Capabilities: SWITCH IGMP
Version:
   WS-C1201 Software, Version DmpSW: 4.26 MnpSW: 4.26
   Copyright (c) 1994,1995 by Cisco Systems
   DMP S/W compiled on Apr 18 1997 15:03:03
   NMP S/W compiled on Apr 18 1997 14:52:51
   System Bootstrap Version 1.1
   Hardware Version: 3.0 Model: WS-C1201 Serial #: 062000101
   1 FDDI Interface
   8 10BaseT interfaces
   4096K bytes of DRAM memory.
   1024K bytes of NMP FLASH memory.
   32K bytes of non-volatile configuration memory.
   Uptime is 8 days, 22 hours, 25 minutes
Platform: WS-C1201
Port-ID (Port on Device): 9
Port (Our Port): 4/1
Console> (enable)
```

*FIG. 10*

```
Console> (enable) show mac raw
MAC SMT-Address        Curr-Path  TReq    TNeg    TMax    TVX
--- ------------------ ---------- ------- ------- ------- -------
1   00:02:d0:03:0b:58  primary    165000  10000   165004  2509
    (00:40:0b:c0:d0:1a)
2   00:02:d0:03:0b:59  secondary  165000  10000   165004  2509
    (00:40:0b:c0:d0:9a)
MAC  Rcv-Frms    Rcv-Smt     Rcv-llc    Tvx-Exp-Ct  RingOp-Ct   RMT-St
---  ----------  ----------  ---------- ----------  ----------  ----------
1    100286      91269       9017       0           94          ring-op
2    96067       91257       4810       0           59          ring-op
MAC  Xmit-Frms   Xmit-Smt    Xmit-llc   Error-Frms  Lost-Frms   Total-Frms
---  ----------  ----------  ---------- ----------  ----------  ----------
1    24743       9363        15380      1           2           440372753
2    9298        9298        0          0           0           440383810
MAC Upstream-Nbr       Downstream-Nbr      Old-Upstream-Nbr    Old-Downstream-Nbr
--- ------------------ ------------------- ------------------- -------------------
1   00:02:d0:50:c0:f3  00:02:d0:03:0b:59   10:00:04:10:8f:35   00:02:d0:50:c0:f3
    (00:40:0b:0a:03:cf)(00:40:0b:c0:d0:9a)(08:00:20:08:f1:ac)  (00:40:0b:0a:03:cf)
2   00:02:d0:03:0b:58  57:53:2d:03:00:48   00:00:1f:00:00:00   00:02:d0:03:06:00
    (00:40:0b:c0:d0:1a)(ea:ca:b4:c0:00:12)(00:00:f8:00:00:00)  (00:40:0b:c0:60:00)
Last-Time-Cleared
-------------------------
Mon Jul 12 1999, 20:45:19
Console> (enable)
```

FIG. 11A

SWITCHED ETHERNET PATH DETECTION

BACKGROUND OF THE INVENTION

Field of the Invention

The present invention relates to the field of data communications networks. More particularly, the present invention relates to a method and apparatus for use in network administration to automatically detect paths to network devices on an Ethernet-type data communications network.

BACKGROUND

A network is a communication system that links two or more computers and peripheral devices, and allows users to access resources on other computers and exchange messages with other users. A network allows users to share resources on their own systems with other network users and to access information on centrally located systems or systems that are located at remote offices. It may provide connections to the Internet or to the networks of other organizations. The network typically includes a cable that attaches to network interface cards ("NICs") in each of the devices within the network. Users may interact with network-enabled software applications to make a network request, such as to get a file or print on a network printer. The application may also communicate with the network software, which may then interact with the network hardware to transmit information to other devices attached to the network.

A local area network ("LAN") is a network that is located in a relatively small physical area, such as a building, in which computers and other network devices are linked, usually via a wiring-based cabling scheme. A LAN typically includes a shared medium to which workstations attach and through which they communicate. LANs often use broadcasting methods for data communication, whereby any device on the LAN can transmit a message that all other devices on the LAN then "listen" to. However, only the device or devices to which the message is addressed actually receive the message. Data is typically packaged into frames or packets for transmission on the LAN.

Currently, the most common LAN media is Ethernet, which traditionally has a maximum bandwidth of 10 Mbps. Traditional Ethernet is a half-duplex technology, in which each Ethernet network device checks the network to determine whether data is being transmitted before it transmits, and defers transmission if the network is in use. In spite of transmission deferral, two or more Ethernet network devices can transmit at the same time, which results in a collision. When a collision occurs, the network devices enter a back-off phase and retransmit later.

As more network devices are added to a LAN, they must wait more often before they can begin transmitting, and collisions are more likely to occur because more network devices are trying to transmit. Today, throughput on traditional Ethernet LANs suffers even more due to increased use of network-intensive programs, such as client-server applications, which cause hosts to transmit more often and for longer periods of time.

FIG. 1 is a block diagram illustrating a network connection between a user 10 and a server 20. FIG. 1 is an example which may be consistent with any type of network,: including a LAN, a wide area network ("WAN"), or a combination of networks, such as in the internet.

When a user 10 connects to a particular destination, such as a requested web page on a server 20, the connection from the user 10 to the server 20 is typically routed through several routers R1 12A–R4 12D. Routers are internetworking devices. They are typically used to connect similar and heterogeneous network segments into Internetworks. For example, two LANs may be connected across a dial-up line, across the Integrated Services Digital Network ("ISDN"), or across a leased line via routers. Routers may also be found throughout the Internet. End users may connect to a local Internet Service Provider ("ISP") (not shown).

As the data traffic on a LAN increases, users are affected by longer response times and slower data transfers, because all users attached to the same LAN segment compete for a share of the available bandwidth of the LAN segment (e.g., 10 Mbps in the case of traditional Ethernet). Moreover, LANs commonly experience a steady increase in traffic even if the number of users remains constant, due to increased network usage of software applications using the LAN. Eventually, performance drops below an acceptable level and it becomes necessary to separate the LAN into smaller, more lightly loaded segments.

LANs are becoming increasingly congested and overburdened. In addition to an ever-growing population of network users, several factors have combined to stress the capabilities of traditional LANs, including faster computers, faster operating systems, and more network-intensive software applications.

There are two traditional approaches to relieving LAN congestion. The first is to simply install a faster networking technology, such as FDDI, ATM, or Fast Ethernet. However, these approaches are expensive to implement. The other traditional approach is to use bridges and routers to reduce data traffic between networks. This solution is also relatively expensive both in money and configuration time, and is only effective when inter-segment traffic is minimal. When inter-segment traffic is high, some bridges and routers can become a bottleneck due to their limited processing power. They also require extensive setup and manual configuration in order to maintain their performance. In addition, despite large buffers, packet loss is always a possibility.

Switching is a technology that alleviates congestion in Ethernet, Token Ring, and Fiber Distributed Data Interface (FDDI) and other similar LANs by reducing traffic and increasing bandwidth. LAN switches are designed to work with existing media infrastructures so that they can be installed with minimal disruption of existing networks.

A Media Access Control ("MAC") address is the unique hexadecimal serial number assigned to each Ethernet network device to identify it on the network. With Ethernet devices, this address is permanently set at the time of manufacture. Each network device has at least one unique MAC address, so that it will be able to receive only the frames that were sent to it. If MAC addresses were not unique, there would be no way to distinguish between two stations. Devices on a network monitor network traffic and search for their own MAC address in each frame to determine whether they should decode it or not. Special circumstances exist for broadcasting to every device on the network. Although some types of network devices, such as NIC's, typically have a single MAC address, other types of network devices, such as routers, bridges, and switches, may have multiple MAC address. Network devices with multiple MAC addresses typically have a MAC address for each port on the network device.

Ethernet uses variable-length frames of data to transmit information from a source to one or more destinations. Every Ethernet frame has two fields defined as the source and destination addresses, which indicate the MAC addresses of the network devices where a frame originated and where it is ultimately destined, respectively. FIG. 2 illustrates the structure of an Ethernet frame, as defined by the Institute of Electrical and Electronic Engineers ("IEEE"). As shown in FIG. 2, the Ethernet frame 22 includes a Preamble 24, a Start of Frame Delimiter 26, a Destination Address 28, a Source Address 30, a Length of Data field 32, a variable-length Data field 34, a Pad 36, and a Checksum 38. The Preamble 24 is a seven-byte field, with each byte containing the bit pattern 10101010 to allow for clock synchronization between sending and receiving stations (not shown). The Start of Frame Delimiter 26 is a one-byte field containing the bit pattern 101010101 to denote the start of the frame itself. The Destination Address 28 and the Source Address 30 are typically six-byte fields which specify the unique MAC addresses of the receiving and sending stations. Special addresses allow for multicasting to a group of stations and for broadcasting to all stations on the network. The Length of Data field 32 specifies the number of bytes present in the Data field 34, from a minimum of 0 to a maximum of 1500. The Pad field 36 is used to fill out the length of the entire frame 22 to a minimum of 64 bytes when the Data field 34 contains a small number of bytes. Finally, the Checksum field 38 is a 32-bit hash code of the Data field 34, which can used by the receiving station to detect data transmission errors.

In the context of the present invention, the term "switching" refers to a technology in which a network device (known as a switch) connects two or more LAN segments. A switch transmits frames of data from one segment to their destinations on the same or other segments. When a switch begins to operate, it examines the MAC address of the frames that flow through it to build a table of known sources. If the switch determines that the destination of a frame is on the same segment as the source of the frame, it drops, or filters, the frame because there is no need to transmit it. If the switch determines that the destination is on another segment, it transmits the frame onto the destination segment only. Finally, using a technique known as flooding, if the destination segment is unknown, the switch transmits the frame on all segments except the source segment.

Logically, a LAN switch behaves similarly to a bridge, which is a different kind of network device. The primary difference is that switches have higher data throughput than bridges, because their frame forwarding algorithms are typically performed by application-specific integrated circuits ("ASICs.") especially designed for that purpose, as opposed to the more general purpose (and relatively slower) microprocessors typically used in bridges. Like bridges, switches are designed to divide a large, unwieldy local network into smaller segments, insulating each segment from local traffic on other segments, thus increasing aggregate bandwidth while still retaining full connectivity. Switches typically have higher port counts than bridges, allowing several independent data paths through the device. This higher port count also increases the data throughput capabilities of a switch.

Because a switch maintains a table of the source MAC addresses received on every port, it "learns" to which port a station is attached every time the station transmits. Then, each packet that arrives for that station is forwarded only to the correct port, eliminating the waste of bandwidth on the other ports. Since station addresses are relearned every time a station transmits, if stations are relocated the switch win reconfigure its forwarding table immediately upon receiving a transmission from the stations.

An Ethernet LAN switch improves bandwidth by separating collision domains and selectively forwarding traffic to the appropriate segments. FIG. 3 illustrates the topology of a typical Ethernet network 40 in which a LAN switch 42 has been installed.

With reference now to FIG. 3, exemplary Ethernet network 40 includes a LAN switch 42. As shown in FIG. 3, LAN switch 42 has five ports: 44, 46, 48, 50, and 52. The first port 44 is connected to LAN segment 54. The second port 46 is connected to LAN segment 56. The third port 48 is connected to LAN segment 58. The fourth port 50 is connected to LAN segment 60. The fifth port 52 is connected to LAN segment 62. The Ethernet network 40 also includes a plurality of servers 64-A–64-C and a plurality of clients 66-A–66-K, each of which is attached to one of the LAN segments 54, 56, 58, 60, or 62. If server 64-A on port 44 needs to transmit to client 66-D on port 46, the LAN switch 42 forwards Ethernet frames from port 44 to port 46, thus sparing ports 48, 50, and 52 from frames destined for client 66-D. If server 64-C needs to send data to client 66-J at the same time that server 64-A sends data to client 66-D, it can do so because the LAN switch can forward frames from port 48 to port 50 at the same time it is forwarding frames from port 44 to port 46. If server 64-A on port 44 needs to send data to client 66-C, which is also connected to port 44, the LAN switch 42 does not need to forward any frames.

Performance improves in LANs in which LAN switches are installed because the LAN switch creates isolated collision domains. Thus, by spreading users over several collision domains, collisions are avoided and performance improves. In addition, many LAN switch installations dedicate certain ports to a single users, giving those users an effective bandwidth of 10 Mbps when using traditional Ethernet.

As a LAN grows, either due to additional users or network devices, additional switches must often be added to the LAN and connected together to provide more ports and new network segments. One way to connect multiple LAN switches together is to cascade them using high-speed ports. However, when cascading LAN switches, the interswitch bandwidth is limited by the number of connections between switches.

Referring now to FIG. 4, two LAN switches 70-A and 70-B are shown, connected in a cascaded configuration. As shown, each of the LAN switches 70-A and 70-B contains eight ports, 72-A–72-H and 74-A–74-H. On each of the LAN switches 70-A and 70-B, four ports 72-A–72-D and 74-A–74-D are connected to computer workstations 76-A–76-D and 76-E–76-H, respectively. The other four ports on each LAN switch (i.e., ports 72-E–72-H on LAN switch 70-A, and ports 74-E–74-H on LAN switch 70-B) are dedicated to interswitch communication. For example, if each of the four interswitch connections is capable of supporting a 100 Mbps Fast Ethernet channel, the aggregate interswitch communication rate of the switches connected as shown in FIG. 4 is 400 Mbps. However, the total number of ports available for connecting to workstations or other network devices on each LAN switch is diminished due to the dedicated interswitch connections that are necessary to implement the cascaded configuration.

As a LAN grows, network devices are typically added to the LAN and Ad interconnected according to the needs of the particular LAN to which they belong. For example, FIG. 5 illustrates an exemplary group of network devices in a LAN 78, and the interconnections between the network devices in the LAN 78. As shown in FIG. 5, the LAN 78 includes seven network devices: six LAN switches 80-A–80-F and a router 82. Each network device is connected to one or more of the other network devices in the LAN 78. Computer workstations, network printers and other network devices are also connected to the LAN 78, but not shown. It is to be understood that the LAN configuration shown in FIG. 5 is exemplary only, and not in any way limiting.

It is often useful for network administrators to discover the intermediate network devices in a path between two devices on a network. Consider the example shown in FIG. 6. As shown in FIG. 6, network device "X" 84 is connected to network device "Y" 86 in an Ethernet 88 by intermediate network devices "A" 90, "B" 92, and "C" 94. Network device "W" 95 and network device "Z" 96 are also part of Ethernet 88, but are not along the path from network device "X" 84 to network device "Y" 86.

It would be useful for a user on network device "X" 84 who wants to discover the path to network device "Y" 86 to be able to enter a command such as "show path to Y" that produces the following output:

| HOP | STATION |
|-----|---------|
| 1   | A       |
| 2   | B       |
| 3   | C       |
| 4   | Y       |

Thus, the user on network device "X" 84 would know that network device "Y" 86 is 4 hops away, and would also know the identity of the station at each intermediate hop. This process is analogous to using the "traceroute" command available on many UNIX systems that can be used to identify IP routers in the path between two IP hosts. However, as discussed in more detail below, the traceroute command requires that the IP address or host name of the destination network device be known. Currently, no mechanism exists for detecting the path to a network device on an Ethernet when only the MAC address of the destination network device is known. Thus, it is an object of the present invention to provided a method and apparatus which permits automatic path detection in Ethernet LANs.

SUMMARY OF THE INVENTION

A method and apparatus for discovering paths to other network devices includes a protocol and network management application that can be executed on network devices. The Ethernet protocol is used to detect paths to other network devices, knowing only the Ethernet address of the destination. A discovery protocol is extended to add hop probe and hop probe reply Type-Length-Value ("ILV") fields in a variable-length list. Hop probe fields contain a hop count, a destination Ethernet address, and a source Ethernet address. When a hop probe is received by a network device, the receiving network device decrements the hop count field by one and looks up the destination address in its address table to determine which port would be used to forward to that address. Packets received with a hop count of one (decremented to zero) are not forwarded. If the received hop count is one, a hop probe reply is sent to the Ethernet source address found in the hop probe TLV field. Hop probe reply TLV's contains a destination Ethernet address field that corresponds to the source of the original hop probe and a source Ethernet address field that corresponds to the station that has received a hop probe with a hop count of one. The discovery protocol on each intermediate station is responsible for forwarding the hop probe and hop probe reply messages until the destination address specified in the hop probe reply TLV is reached.

BRIEF DESCRIPTION OF THE DRAWINGS

FIG. 6 is a block diagram illustrating an exemplary Ethernet network with seven so interconnected network devices.

FIG. 7 shows a sample output screen from the "show cdp neighbors" command.

FIG. 8 shows a sample output screen from the "show cdp neighbor 4" command.

FIG. 9 shows a sample output screen from the "show cdp neighbors detail" command.

FIG. 10 shows a sample output screen from the "show cdp neighbor 4 detail" command.

FIG. 11A shows a sample output screen from the "show mac raw" command.

FIG. 11B shows a sample output screen from the "show mac dynamic" command.

FIG. 11C shows a sample output screen from the "show mac static" command.

DETAILED DESCRIPTION OF THE PREFERRED EMBODIMENTS

Figure 1:
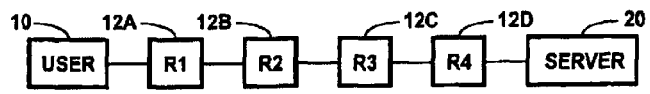
FIG. 1 is a block diagram of an exemplary network connection between a user and a server.
Figure 2:
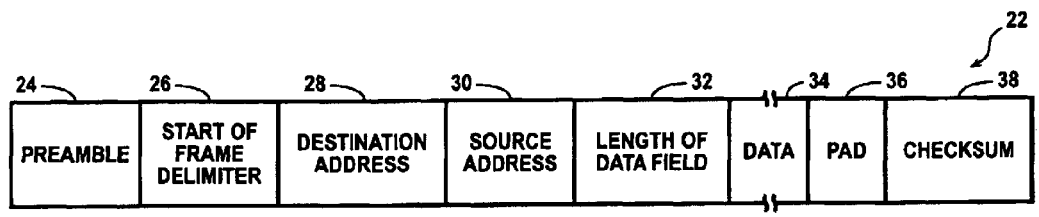
FIG. 2 is a diagram illustrating the structure of an Ethernet data frame.
Figure 3:
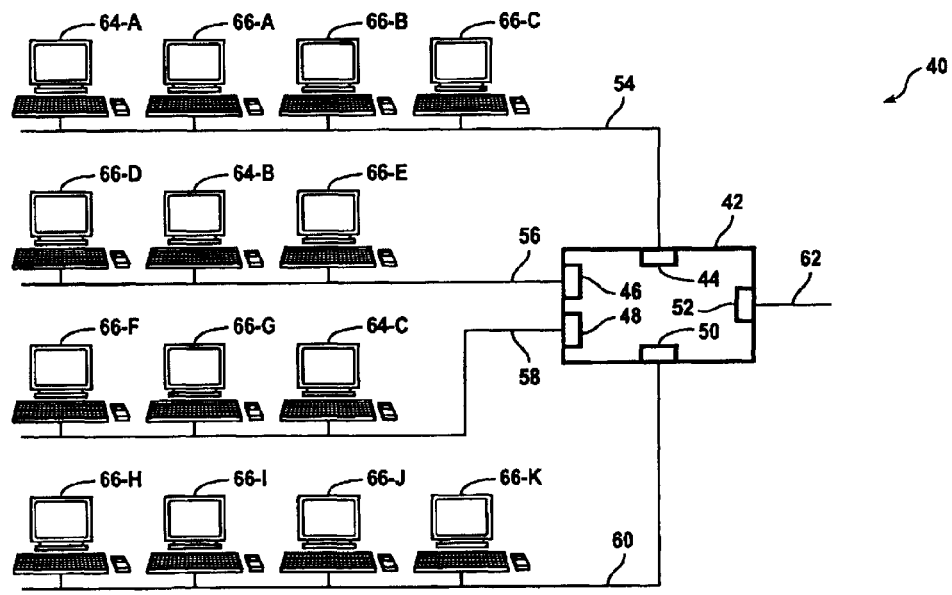
FIG. 3 is a block diagram illustrating the topology of an exemplary LAN incorporating a LAN switch.
Figure 4:
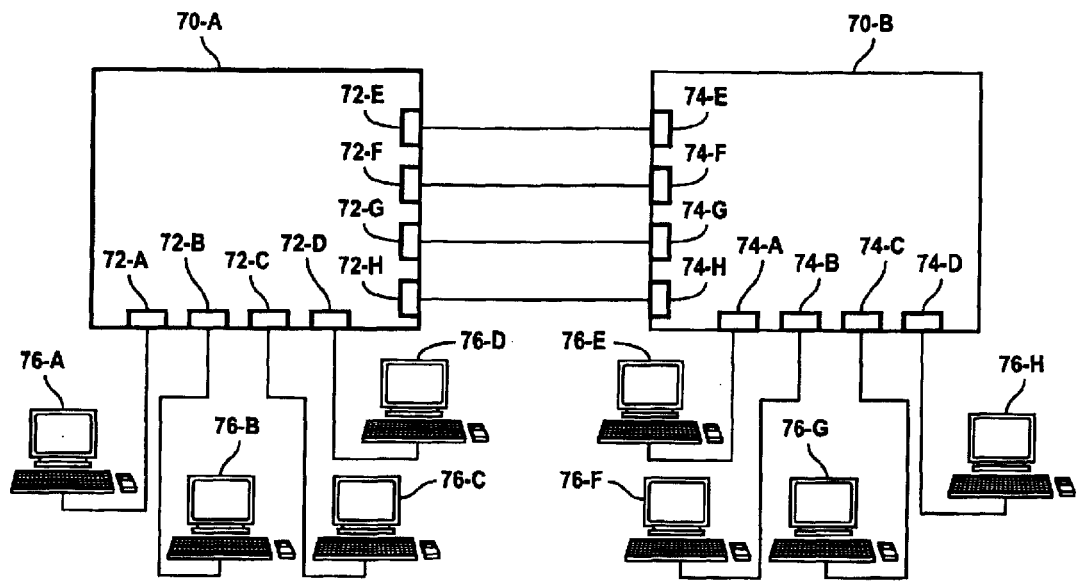
FIG. 4 is a block diagram illustrating an exemplary LAN with two LAN switches interconnected in a cascaded configuration.
Figure 5:
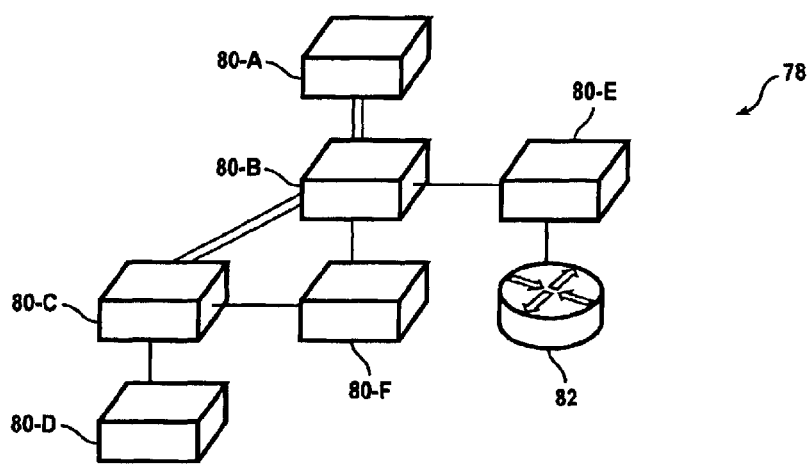
FIG. 5 is a block diagram illustrating the topology of an exemplary LAN incorporating six LAN switches and a router.

Those of ordinary skill in the art will realize that the following description of the present invention is illustrative only and not in any way limiting. Other embodiments of the invention will readily suggest themselves to such skilled persons having the benefit of this disclosure.

Internetworks can exhibit a wide variety of topologies and levels of complexity—from single-protocol, point-to-point links connecting cross-town campuses to highly meshed, large-scale WANs traversing multiple time zones and international boundaries. However, the overall trend is toward increasingly complex environments involving multiple media and multiple protocols. As a result, the potential for connectivity and performance problems in internets is often high, even when all elements of an environment appear to be fully operational.

Partly as a result of the increased complexity of networks, network administrators must often troubleshoot problems with their network. Two classes of network problems often faced by network administrators are "reachability" problems and performance slowdowns. Reachability problems occur when one or more network devices cannot be accessed through a network, and can be caused by hardware or software failures, cabling problems, or any of several other types of difficult-to-diagnose problems that can occur in a network.

In general, performance slowdowns are considered lower priority problems than reachability issues. However, poorly performing Internetworks can degrade organizational productivity and often can effectively halt operation of network applications if communications degenerate enough. Performance problems can manifest themselves in many ways. Slow host response, dropped connections, and high error counts all suggest that network performance is not optimal. Unfortunately, the actual sources of reachability and performance problems are often difficult to detect.

When network devices such as LAN switches are first installed, they are cabled together according to the network configuration desired for a particular application. Network devices may be configured and managed using either out-of-band or in-band techniques. Out-of-band configuration and management are typically performed by by connecting to the console port on the network device and using the management console locally from a terminal or remotely through a modem. Alternatively, network devices may be configured and managed "in-band," either by connecting via Telnet to the network device and using a management console, or by communicating with the network device's in-band management interface using the industry standard Simple Network Management Protocol ("SNMP"). This can be accomplished by using an SNMP-compatible network management application and the network device's Management Information Base ("MIB") files. Normally, however, in order to perform in-band administrative tasks of a network device, such as configuration and management, the network device must first be assigned an IP address. Additionally, in order to use in-band configuration and management capabilities, the SNMP management platform of the network device must be configured to understand and be able to access the objects contained in the network device's MIB.

Some of the world's largest networks today rely on the TCP/IP suite of networking protocols. With a relatively small kit of basic tools, network administrators can learn much about an internetwork. "Ping" and "traceroute" commands, "show" commands, and "debug" commands (all of which are typically available via the basic management interface on a network device) form the core of the network administrator's internetwork toolkit. Ping and traceroute commands can be useful tools in determining where failures are occurring, but they are cumbersome to use, and require knowledge of the IP address or host name of the destination network device. The show commands provide information about interface conditions, protocol status, neighbor reachability, router configuration and status, level of traffic, errors and drops, and other network data. Finally, debug commands provide clues about the status of a network device and other network devices directly or indirectly connected to it. Because debug commands can create performance slowdowns, they must be used with great care, and using the wrong debug command at the wrong time can exacerbate problems in already poorly performing networks.

The "ping" and "traceroute" utilities are currently two popular and useful internetworking diagnostic tools. The ping capability provides a simple mechanism to determine whether packets are reaching a particular destination. The traceroute capability allows a network administrator to determine the specific path taken to a destination and where packets are stopping. However, as mentioned earlier, knowledge of the destination IP address or host name is a requirement of both ping and traceroute.

Traceroute is a network utility known to those of ordinary skill in the art of network administration that will trace the route taken from one host or machine to another. This information can be valuable in determining a breakdown in the network. The traceroute program attempts to trace the route an IP packet would follow to a given internet host by launching User Data Protocol ("UDP") probe packets with a small "ttl" (time to live), then listening for an Internet Control Message Protocol ("ICMP") "time exceeded" reply from a gateway. Probes start with a ttl of one, and increase by one until an ICMP "port unreachable" is received (indicating that the given "host" was reached) or reach a maximum value (which defaults to 30 hops but can be changed by a user). Three probes are sent at each ttl setting, and a line is printed showing the ttl, address of the gateway and round trip time of each probe. If the probe answers arrive from different gateways, the address of each responding system will be printed. If there is no response within a three-second timeout interval, an asterisk "*" or other indicator is printed for that probe. However, knowing the IP address or host name of the destination host is a necessary input parameter for the traceroute utility. Without knowing the IP address or host name of the destination host, currently no method is available to trace the path to a network destination if only the MAC address is known.

A network device's "show" commands are another category of network tools that can currently be used for understanding the status of a network device, detecting neighboring network devices, monitoring the network in general, and isolating problems in the internet. Show commands are important in many troubleshooting and monitoring situations. These commands can be used to monitor network device behavior during initial installation, to monitor normal network operation, to isolate problem interfaces, nodes, media, or applications, to determine when a network is congested, or to determine the status of servers, clients or other neighbors on a network. However, using show commands to troubleshoot network problems can be a cumbersome and slow process, because a user must repeatedly log in to many different network devices, each with its own set of user names, passwords, and management interfaces.

For some protocols, such as Novell IPX and AppleTalk, the methodical use of show commands is also known to those skilled in the art of network administration as a reliable but cumbersome method to create a topology map of an internetwork. To create a topology map using show commands, the following methodology must be used. First, the appropriate "show protocol route" command (e.g., "show novell route" must be used to determine which neighbors are directly connected to the network device on which the show command is executed. Next, the names and network addresses of all directly connected neighbors are recorded. Then, a connection must be opened to each of these directly connected neighbors. Finally, the "show protocol route" commands are executed at each of the directly connected neighbors. This process must be continued recursively for all the network devices in the internet until the desired network device is identified. The resulting map reflects all paths to the network devices in the internet.

Embodiments of the present invention as illustrated herein use the Cisco™ Discovery Protocol ("CDP") to automatically detect paths to specified network devices in Ethernet LANs. However, other similar products known to those of ordinary skill in the art are available from other vendors to accomplish the same task.

CDP is a media-independent device discovery protocol which can be used by a network administrator to view information about other network devices directly attached to a particular network device. In addition, network management applications can retrieve the device type and SNMP-agent address of neighboring network devices. This enables applications to send SNMP queries to neighboring devices. CDP thus allows network management applications to discover devices that are neighbors of already known devices, such as neighbors running lower-layer, transparent protocols.

It is to be understood that the present invention is not limited to devices that are compatible with CDP. CDP runs on all media that support the Subnetwork Access Protocol ("SNAP"), including LAN and Frame Relay. CDP runs over the data link layer only. Each network device sends periodic messages to a multicast address and listens to the periodic messages sent by others in order to learn about neighboring devices and determine when their interfaces to the media go up or down. Each device also advertises at least one address at which it can receive SNMP messages. CDP messages, or "advertisements," contain holdtime information, which indicates the period of time a receiving device should hold CDP information from a neighbor before discarding it. With CDP, network management applications can learn the device type and the SNMP-agent address of neighboring devices. This process enables applications to send SNMP queries to neighboring devices.

Table 1 summarizes some key terms associated with the CDP discovery protocol used in embodiments of the present invention, and provides a description for each term.

TABLE 1

CDP Terms and Descriptions

| Term | Description |
| --- | --- |
| advertisement | An updated information packet sent periodically by the CDP process. |
| holdtime | The amount of time, in seconds, that a receiving network device should hold a CDP advertisement from a neighbor before discarding it. |
| neighbor | A remote system, connected to the subject system on one or more of its interfaces. |
| Type Length Value (TLV) field | A block of information embedded in a CDP advertisement. |

The "show mac" and "show cdp neighbors" commands are two of the CDP commands that can be used by a network administrator to diagnose and troubleshoot problems in an Ethernet. Referring now to FIG. 7, a sample output from the "show cdp neighbors" command is shown, executed on an Ethernet switch. As shown in FIG. 7, Device ID, interface type and number, holdtime settings, capabilities, platform, and port ID information about each of the switch's neighbors are displayed on the management console upon execution of the "show cdp neighbors" command.

The "show cdp neighbors" command displays the type of device that has been discovered, the name of the device, the number and type of the local interface (i.e., "port"), the number of seconds the CDP advertisement is valid for the port, the device type, the device product number, and the port ID. Issuing the "detail" keyword displays additional information on the native Virtual Local Area Network ("VLAN") ID, the duplex mode, and the Virtual Trunking Protocol ("VTP") domain name associated with neighbor devices. Table 2 illustrates the field descriptions displayed when the "show cdp neighbors" command is executed on a network device.

TABLE 2

Field Descriptions for "show cdp neighbors" Command

| Field | Definition |
| --- | --- |
| Capability Codes | The type of device that can be discovered. |
| Device ID | The name of the neighbor device and either the MAC address or the serial number of this device. |
| Local Intrfce | The protocol being used by the connectivity media. |
| Holdtme | The remaining amount of time, in seconds, the current device will hold the CDP advertisement from a transmitting router before discarding it. |
| Capability | The type of the device listed in the CDP Neighbors table. Possible values are:<br>R—Router<br>T—Transparent bridge<br>B—Source-routing bridge<br>S—Switch<br>H—Host<br>I—IGMP device<br>r—Repeater |
| Platform | The product number of the device. |
| Port ID | The protocol and port number of the device. |

Referring now to FIG. 8, a sample output screen is shown for the "show cdp neighbor" command, executed with the parameter "4" to show information about the neighbors of a network device that are connected to port 4. As shown in FIG. 8, Port Device ID, Platform, and Capability information about each of the switch's neighbors connected to port 4 of the switch are displayed on the management console upon execution of the "show cdp neighbors 4" command.

In certain network troubleshooting situations, a network administrator may wish to learn detailed information about the neighbors of a network device. In such situations, the "show cdp neighbors" command may be executed with the "detail" parameter enabled. FIG. 9 is a sample output for one neighbor from the "show cdp neighbors detail" command. The "detail" keyword provides additional information about a device's neighbors, including network address, enabled protocols, and software version of each neighbor.

As is known to those skilled in the art of network administration, VIP is a discovery technique deployed by Ethernet switches, whereby each switch advertises its management domain on its trunk ports, its configuration revision number, and its known Virtual Local Area Networks ("VLANs") and their specific parameters. A VTP domain is made up of one or more interconnected devices that share the same VIP domain name. Each switch can be configured to be in only one VTP domain.

Table 3 illustrates the field descriptions displayed when the "show cdp neighbors" command is executed on a network device with the "detail" parameter enabled.

TABLE 3

Field Descriptions for "show cdp neighbors detail" Command

| Field | Definition |
|---|---|
| Device ID | The name of the neighbor device and either the MAC address or the serial number of this device. |
| Entry address(es) | A list of network addresses of neighbor devices. |
| [network protocol] address | The network address of the neighbor device. The address can be in IP, IPX, AppleTalk, DECnet, or CLNS protocol conventions. |
| Platform | The product name and number of the neighbor device. |
| Capabilities | The device type of the neighbor. This device can be a router, a bridge, a transparent bridge, a source-routing bridge, a switch, a host, an IGMP device, or a repeater. |
| Interface | The protocol and port number of the port on the current device. |
| Holdtime | The remaining amount of time, in seconds, the current device will hold the CDP advertisement from a transmitting router before discarding it. |
| Version | The software version of the neighbor device. |
| Duplex Mode | The duplex state of connection between the current device and the neighbor device. |
| Native VLAN | The ID number of the VLAN on the neighbor device. |
| VTP Management Domain | A string that is the name of the collective group of VLANs associated with the neighbor device. |

The "show cdp neighbors" may be executed with both the "detail" keyword enabled and a particular port selected. As an example, FIG. 10 shows a sample output screen for the "show cdp neighbor detail 4" command. As shown in FIG. 10, Port Device ID, Platform, and Capability information about each of the switch's neighbors connected to port 4 of the switch are displayed on the management console upon execution of the command.

As discussed above, the "show mac" command is another CDP command that can also be used by network administrators to manually diagnose and troubleshoot network problems. Referring now to FIG. 1A, a sample output screen is shown for the "show mac" command, executed with the "raw" keyword enabled. As shown in FIG. 11A and detailed in Table 4A, the following information can be displayed on the management console of a network device upon execution of the "show mac raw" command.

TABLE 4A

Field Descriptions for "show mac raw" Command

| Field | Definition |
|---|---|
| MAC | Indicates which MAC is being referenced by the data in the other fields. Refers to the 48-bit MAC address, and displays in two versions: the FDDI version (first) and the canonical version, as shown in the following partial sample display: |
| SMT-Address | MAC SMT-Address<br>--- ----------------<br>1    cisco:01:07:1e    (FDDI version)<br>    (00:40:0b:80:e0:78)    (canonical version) |

TABLE 4A-continued

Field Descriptions for "show mac raw" Command

| Field | Definition |
|---|---|
| Curr-Path | Indicates the current path handled by the MAC and takes one of the following values:<br>Primary—Displays if the MAC is on the primary path.<br>Secondary—Displays if the MAC is on the secondary path.<br>Isolated—Displays if the MAC is not on any path but is isolated.<br>Unknown—If the concentrator cannot determine the path, it returns a value of unknown.<br>Other—if the concentrator is unable to determine the path, it returns a value of other. |
| TReq | Shows the time in microseconds that the MAC requests as the average token rotation time. You can configure this parameter with the set treq command. |
| TNeg | Contains the TReq value agreed on by all MACs in the ring. |
| TMax | Holds the maximum time in microseconds that the MAC will send out as a TReq value. |
| TVX | Displays the time in microseconds of the MAC valid transmission timer. |
| Rcv-Frms | Displays the total number of frames received by the MAC. |
| Rcv-Smt | Displays the total number of SMT frames received by the MAC. |
| Rcv-llc | Displays the total number of logical link control (LLC) frames received by the MAC. |
| Tvx-Exp-Ct | Displays the number of TVX expirations counted by the MAC. |
| RingOp-Ct | Displays the number of times the ring has encountered a break and restarted. The ring management (RMT) state. Ring management identifies stuck beaconing, initiates traces, provides notification of MAC availability, and detects duplicate addresses that prevent ring operation. This field will display one of the following: |
| RMT-St | Isolated—The initial state of RMT.<br>Non-op—The ring is not operational; however, the MAC is participating in ring recovery procedures.<br>Ring-op—The MAC is part of an operational FDDI ring.<br>Detect—The ring is not operational because a duplicate address has been detected.<br>NonOp-dup—The ring is not operational because a duplicate address was detected, and this MAC's address is one of the duplicates.<br>Rng-Op-Dup—A duplicate address has been detected on the ring, and this MAC's address is one of the duplicates. The ring, however, remains operational.<br>Directed—The MAC is sending directed beacon frames out to attempt to isolate a local-area network (LAN) fault.<br>Trace—Indicates that the MAC initiated a trace function. Trace provides a recovery mechanism from a stuck beacon that cannot be traced to a single link. In this condition, all stations leave the ring, perform a self-test, and rejoin the ring if they are not faulty. |
| Xmit-Frms | Contains the total number of frames transmitted by the MAC. |
| Xmit-Smt | Contains the total number of SMT frames transmitted by the MAC. |
| Xmit-llc | Contains the total number of LLC frames transmitted by the MAC. The LLC frames contain user and application data. |
| Error-Frms | Shows the total number of error frames that a MAC has detected (no other MACs have set the frame-error-detected indicator). |
| Lost-Frms | Displays the total number of frames received by the MAC that contain an error. |
| Total-Frms | Contains the total number of frames seen by the MAC. |
| Upstream-Nbr | Contains the address of the most recently known upstream neighbor to the MAC. |
| Downstream-Nbr | Contains the address of the most recently known downstream neighbor, the next MAC to receive frames from this MAC. |
| Old-Upstream-Nbr | Contains the MAC address of the previous upstream neighbor. |

TABLE 4A-continued

Field Descriptions for "show mac raw" Command

| Field | Definition |
|---|---|
| Old-Downstream-Nbr | Contains the MAC address of the previous downstream neighbor. |
| Last-Time-Cleared | Displays the date and time that the MAC counters were last cleared. |

The "show mac" CDP may also be executed with the "dynamic" or "static" keywords enabled. The output of the "show mac dynamic" and "show mac static" commands is simpler than "show mac raw," and often more appropriate when a network administrator seeks to determine which port or ports are used to reach a particular destination. Referring now to FIG. 11B, a sample output screen is shown for the "show mac" command, executed with the "dynamic" keyword enabled. As shown in FIG. 11B, for a given destination address, the "show mac dynamic" command can display the corresponding Address Type (static or dynamic), VLAN, and Destination Port.

FIG. 11C illustrates a sample output screen for the "show mac" command, executed with the "static" keyword enabled. As shown in FIG. 11C, for a given destination address, the "show mac static" command can display the corresponding VLAN, Input Port, and Output Ports. Those skilled in the art understand that the above variations of the "show mac" command may be used to determine which port or ports in a network device are used to reach a particular destination.

The present invention is directed to a protocol and network management application that can be executed on network devices using the Ethernet protocol to detect paths. The CDP protocol provides for extensions by specifying a variable-length list of Type-Length-Value ("TLV") fields in each CDP packet. Table 5 summarizes currently existing TLV fields.

TABLE 5

Existing TLV Descriptions

| TLV | Definition |
|---|---|
| Device-ID | Identifies the device name in the form of a character string. |
| Address TLV | Contains a list of network addresses of both receiving and transmitting devices. |
| Port-ID | Identifies the port on which the CDP packet is sent. |
| Capabilities | Describes the device's functional capability in the form of a device type, for example, a switch. |
| Version | Contains information about the software release version on which the device is running. |
| Platform | Describes the hardware platform name of the device, for example, Cisco 4500. |
| IP Network Prefix | Contains a list of network prefixes to which the sending device can forward IP packets. This information is in the form of the interface protocol and port number, for example, Eth 1/0. |

Figure 12:
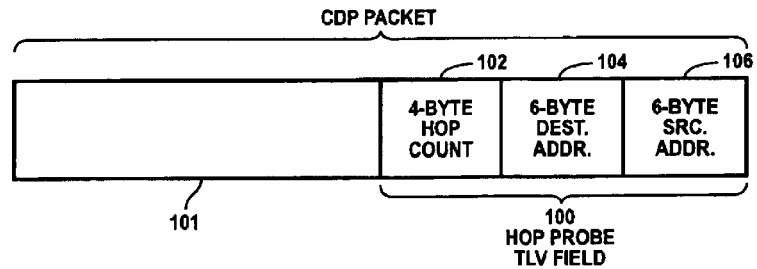
FIG. 12 is a diagram illustrating the structure of Hop Probe TLV field according to an aspect of the present invention.

Referring now to FIG. 12, embodiments of the present invention use a new "Hop Probe" TLV field 100 in a CDP packet 101 that contains a 4-byte hop count 102, a 6-byte Ethernet destination address 104, and a 6-byte Ethernet source address 106.

According to the present invention, when a hop probe is received by a network device, the receiving network device decrements the hop count field by one and looks up the destination address in its address table to determine which port would be used to forward to that address. If the destination address is unknown, the packet is "flooded" (i.e., sent to all forwarding ports). Packets received with a hop count of one (decremented to zero) are not forwarded.

Figure 13A:
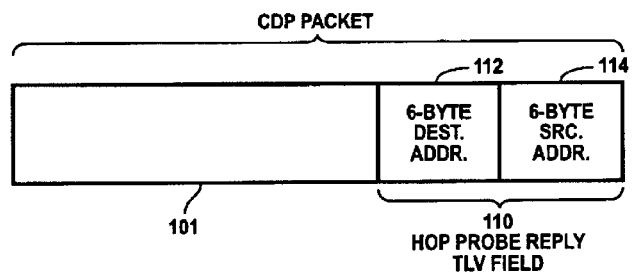
FIG. 13A is a diagram illustrating the structure of Hop Probe Reply TLV field according to an aspect of the present invention.

If the received hop count is one, a "Hop Probe Reply" is sent to the Ethernet source address found in the hop probe TLV. As shown in FIG. 13A, the Hop Probe Reply TLV 110 contains a 6-byte Ethernet destination address field 112 that corresponds to the source of the original hop probe and a 6-byte Ethernet source address field 114 that corresponds to the station that has received a hop probe with a hop count of one. The CDP process on each intermediate station is responsible for forwarding the Hop Probe and Hop Probe Reply messages until the destination address specified in the Hop Probe Reply TLV is reached.

Figure 13B:
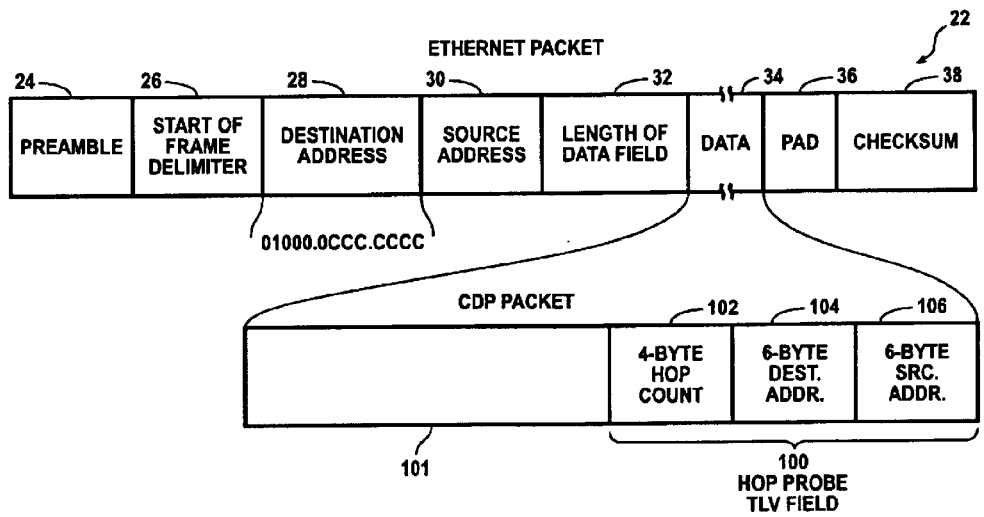
FIG. 13B is a diagram illustrating the structure of a CDP packet with a Hop Probe TLV field embedded within an Ethernet frame according to aspects of the present invention.

FIG. 13B is a diagram illustrating the structure of a CDP packet 101 with a Hop Probe TLV field 100 embedded within an Ethernet frame 22 according to aspects of the present invention. As shown in FIG. 13B, the Destination Address field 28 of the Ethernet frame 22 is set to the CDP multicast address, which is 0100.0CCC.CCCC in hexadecimal notation. Also, a CDP packet 101 with a Hop Probe TLV field 100 as in FIG. 12 has been included in the variable-length Data field 34 of Ethernet frame 22.

Figure 13C:
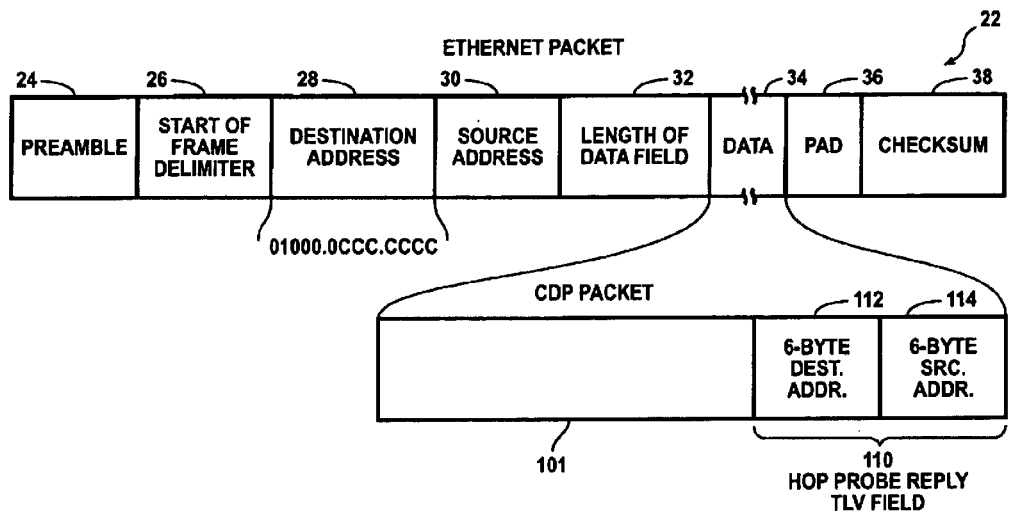
FIG. 13C is a diagram illustrating the structure of a CDP packet with a Hop Probe Reply TLV field embedded within an Ethernet frame according to aspects of the present invention.

Similarly, FIG. 13C is a diagram illustrating the structure of a CDP packet 101 with a Hop Probe Reply TLV field 110 embedded within an Ethernet frame 22 according to aspects of the present invention. As shown in FIG. 13C, the Destination Address field 28 of the Ethernet frame 22 is also set to the CDP multicast address (0100.0CCC.CCCC in hexadecimal notation). A CDP packet 101 with a Hop Probe Reply TLV field 110 as in FIG. 13A has been included in the variable-length Data field 34 of Ethernet frame 22.

Figure 14:
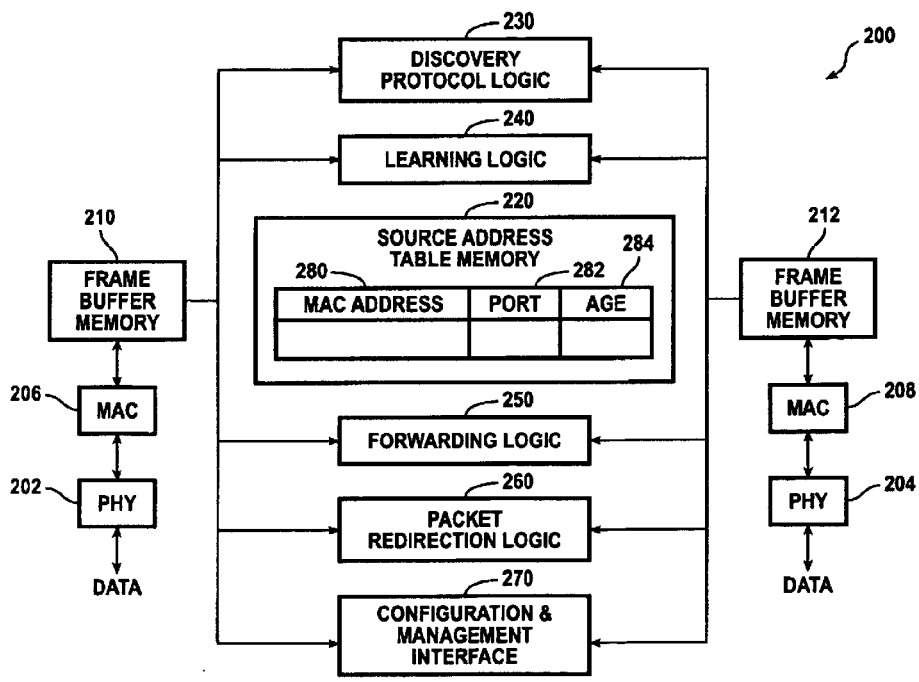
FIG. 14 is a block diagram of an Ethernet switch according to an aspect of the present invention.

Referring now to FIG. 14, a block diagram of an Ethernet switch according to one aspect of the present invention is shown. As shown in FIG. 14, Ethernet switch 200 includes a Layer 1 Physical Interface ("PHY") 202, 204, and a Layer 2 Media Access Control Interface ("MAC"); 206, 208, for each port on the Ethernet switch 200. A network interface card ("NIC") consists of a MAC and a PHY. An Ethernet switch also contains a MAC and PHY on every port. Thus, an Ethernet switch may appear to a network as multiple NICs coupled together. Each switch PHY 202, 204, receives the incoming data bit stream and passes it to its corresponding MAC 206, 208, which reassembles the original Ethernet frames.

Ethernet switch 200 also includes a frame buffer memory 210, 212, for each port, a source address table memory 220, discovery protocol logic 230, learning logic 240, forwarding logic 250, packet redirection logic 260, and a configuration and management interface 270 During operation, the learning logic 240 will look at the source address ("SA") within a received Ethernet frame and populate the Source Address Table ("SAT") memory 220 with three columns: MAC address 280, port number 282, and age 284. The MAC address is the same as the source address that a sender has embedded into the flame. The age item will be a date stamp to indicate when the last frame was received from a particular MAC SA. In the example shown in FIG. 14, the port number may be 1 or 2. The SAT is also known as the Switch Forwarding Table ("SFT").

Forwarding logic 250 examines at the destination address ("DA") of a received Ethernet frame. This now becomes the new MAC address, which is then compared with the entries in the SAT. Four different forwarding options are possible.

If the destination address is a specific address, known as a "broadcast" address, the frame is destined for all ports on the network. In this case, the Ethernet switch will forward the frame to all ports, except the one on which the frame was received. A broadcast address is six bytes with all ones, or "FF.FF.FF.FF.FF.FF" in hexadecimal notation. If the MAC address is found in the SAT and the corresponding port number is different from the received port, the frame is forwarded to that particular port number only. If the MAC address is found in the SAT and the port number is the same as the received port number, the frame is not forwarded; instead, it is discarded. This is known as "filtering." The frame is discarded because the transmitting station and the receiving station are connected on the same shared LAN segment on that particular port and the receiver has already tuned into the frame. If the MAC address is not found in the table, the frame is forwarded to all ports. The reason a particular destination address is not present in the SAT table is that the receiving device could be new on the network, or the recipient has been very quiet (has not recently sent a frame). In both cases, the bridge SAT will not have a current entry. Flooding the frame on all ports is the brute way of ensuring that the frame is routed to its intended recipient.

Ethernet switch 200 uses the "age" entry in the SAT to determine whether that MAC address is still in use on the LAN. If the age has exceeded a certain preset value, the entry is removed. This conserves memory space and makes the bridge faster because fewer entries need to be scanned for address matching. Finally, the frame buffer memories 210, 212 will store frames on each port in case there is a backlog of frames to be forwarded.

According to embodiments of the present invention, discovery protocol logic 230 receives, processes, and sends CDP or other discovery protocol packets to neighboring network devices on the network. Packet redirection logic 260 examines the source and destination addresses of Ethernet packets under control of the configuration and management interface 270 and forwards them to other network devices, in a cluster configuration.

In addition to the hop probe protocol according to embodiments of the present invention, an application program can use the hop probe protocol to build a list of hops and stations in the path to a requested destination. According to embodiments of the present invention, Hop Probe and Hop Probe reply packets are sent to the CDP multicast address, which is 0100.0CCC.CCCC in hexadecimal notation.

On each network device implementing embodiments of the present invention, the output interfaces used to send a Hop Probe packet are selected by searching the MAC address table for the probe destination address. Similarly, the output interfaces used to send a Hop Probe Reply packet are selected by searching the MAC address table for the probe reply destination address, which is the source address from the received Hop Probe packet.

The application program starts by sending a Hop Probe with a hop count of one, the destination Ethernet address of the desired station, and its own source address in the source address field. The adjacent station sends a Hop Probe Reply. The application program then sends a Hop Probe with a hop count of two and the station beyond the adjacent station sends a Hop Probe Reply. The application program continues to increase the hop count and send Hop Probes until a Hop Probe Reply is received: that contains the address of the desired station in the source address field. In this manner, a list of hop counts and stations can be created by the application program.

If no Hop Probe Reply is received at the end of a timeout period, the same Hop Probe is resent. Timeouts and retries continue until a Hop Probe Reply is received or the maximum number of retries is reached. Both the timeout and the number of retries are configurable in embodiments of the present invention.

Figure 15:
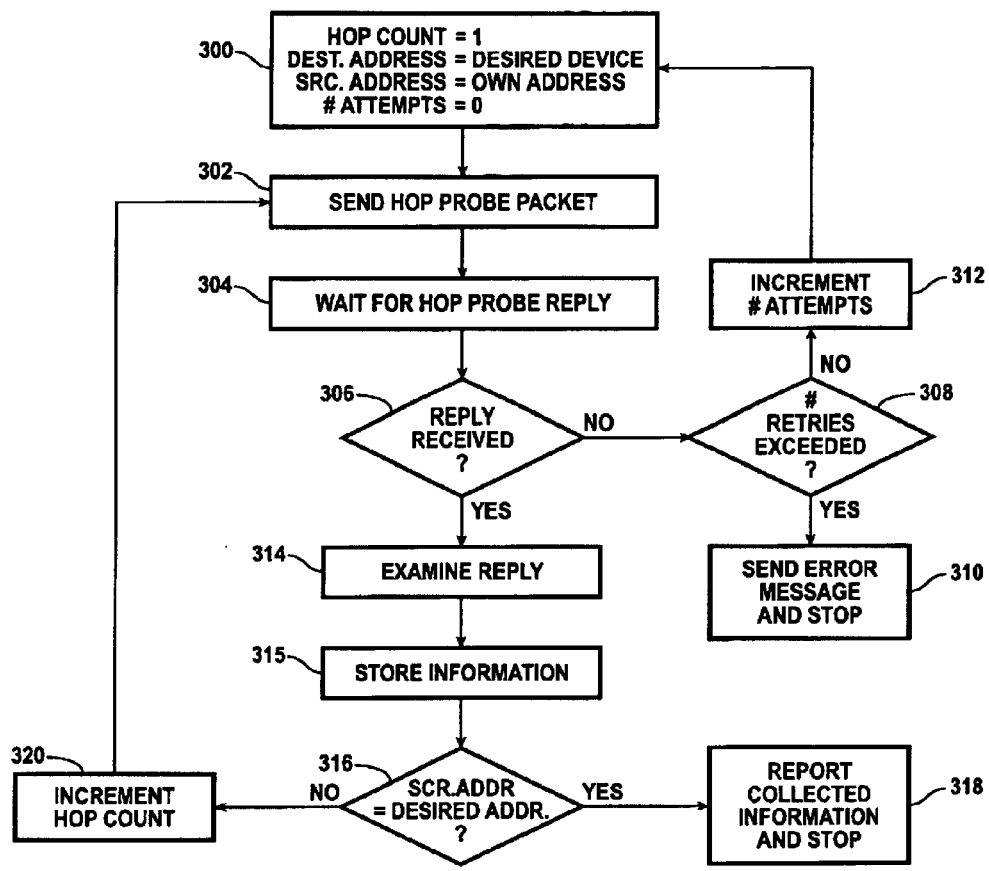
FIG. 15 is a flow chart illustrating the operation of an application program according to embodiments of the present invention that uses the hop probe protocol is according to aspects of the present invention to build a list of hops and stations in the path to a requested destination.

FIG. 15 is a flow chart illustrating the operation of an application program according to embodiments of the present invention that uses the hop probe protocol according to aspects of the present invention to build a list of hops and stations in the path to a requested destination.

Referring now to FIG. 15, FIG. 13B, and FIG. 13C, the application program executing on a network device according to an embodiment of the present invention (i.e., a network device from which a path to another network device is to be detected) starts at step 300 by setting the hop count field 102 to one, the destination Ethernet address field 28 to the desired network device that is to be detected, the source Ethernet address field 30 to its own Ethernet address, and a variable indicating the number of attempts made so far to zero. At step 302, the network device sends a Hop Probe packet with the above settings to adjacent stations. At step 304, the network device waits for a Hop Probe Reply from an adjacent station that is on the path to the desired network device sought to be detected. At step 306, a decision is made depending on whether a Hop Probe Reply is received within a specified timeout period. If no reply is received, a decision is made at step 308 depending on whether the number of attempts made so far exceeds the maximum number of attempts allowed, which is a configurable number. the maximum number of attempts has been exceeded, at step 310 the application signals an appropriate message such as "desired network device not found" and stops execution.

Referring back to step 308 of FIG. 15, if the maximum number of attempts has not been exceeded, the number of attempts made so far is incremented at step 312, and the application program loops back to step 302, where the same Hop Probe packet is retransmitted.

If a Hop Probe Reply packet is received at step 306 (indicating that the network device which sent the Hop Probe Reply packet is on the path to the desired network device), the received Hop Probe Reply packet is examined at step 314, and information regarding the network device from which the Hop Probe Reply was received is stored at step 315. At step 316, a decision is made depending on whether the received Hop Probe Reply packet contains the Ethernet address of the desired network device in the source address field. If the received Hop Probe Reply packet contains the Ethernet address of the desired network device in the source address field, the path detection process is complete, because the network device which sent the Hop Probe Reply packet must be the desired network device to which a path was to be detected, and the application stops execution at step 318 by reporting all the information that had been collected at step 315 for all the network devices along the path to the desired network device.

Otherwise, if the received Hop Probe Reply packet does not contain the Ethernet address of the desired network device in the source address field, the hop count field 102 of FIG. 13B is incremented at step 320, and the application program loops back to step 302, where the path detection process continues, with each iteration of the process resulting in the detection of the next network device along the path to the desired network device.

It should be noted that-normally, CDP packets according to aspects of the present invention are transmitted at regular intervals (e.g. once every 60 seconds). However, in embodiments of the present invention, when a Hop Probe or Hop Probe Reply needs to be forwarded by a network device, the network device is commanded to send a CDP packet immediately.

The present invention is much faster than the previous method that involved logging in to each intermediate network device, entering the "show cdp neighbors" command, and interpreting the output to find the next hop along the path to the destination network device. Also, the present invention allows individual users, such as network administrators, to execute a tool to manually discover paths through a network of Ethernet switches. The present invention can be used by network management software to automatically map the topology of clusters of network devices, such as Ethernet switches. Finally, the present invention is useful in loop detection. Enhancements to Spanning Tree and other bridge-level routing protocols can test proposed changes to switch topology prior to making them.

While embodiments and applications of this invention have been shown and described, it would be apparent to those of ordinary skill in the art having the benefit of this disclosure that many more modifications than mentioned above are possible without departing from the inventive concepts herein. The invention, therefore, is not to be, restricted except in the spirit of the appended claims.

What is claimed is:

1. A method for detecting the path to a first network device, said method comprising:
    receiving a data packet from a second network device, the data packet containing a hop count, a destination Ethernet address corresponding to the first network device, and a source Ethernet address corresponding to the second network device;
    examining the hop count in the received data packet;
    if the hop count is one, transmitting a reply data packet toward the source Ethernet address;
    if the hop count is greater than one, decrementing the hop count by one to form a modified data packet;
    determining at least one port on a network device receiving the data packet, by examining the destination Ethernet address; and
    forwarding the modified data packet through the at least one port.

2. The method in accordance with claim 1, wherein the modified data packet is not forwarded if the destination Ethernet address is the same as the Ethernet address of the network device receiving the data packet.

3. A method for detecting a path to a first network device, comprising:
    transmitting from a second network device, the data packet containing a hop count, a destination Ethernet address corresponding to the first network device, and a source Ethernet address corresponding to the second network device;
    receiving the data packet at a third network device;
    examining the hop count in the received data packet;
    if the hop count is one, transmitting a reply data packet toward the source Ethernet address;
    if the hop count is greater than one, decrementing the hop count by one to form a modified data packet;
    determining at least one port on the third network device by examining the destination Ethernet address; and
    forwarding the modified data packet from the third network device through the at least one port.

4. A program storage device readable by a machine, tangibly embodying a program of instructions executable by the-machine to perform a method for detecting a path to a first network device, the method comprising:
    receiving a data packet from a second network device, the data packet containing a hop count, a destination Ethernet address corresponding to the first network device, and a source Ethernet address corresponding to the second network device;
    examining the hop count in the received data packet;
    if the hop count is one, transmitting a reply data packet toward the source Ethernet address;
    if the hop count is greater than one, decrementing the hop count by one to form a modified data packet;
    determining at least one port on a network device receiving the data packet, by examining the destination Ethernet address; and
    forwarding the modified data packet from the network device through the at least one port.

5. A method for detecting a path to a first network device, said method comprising:
    initializing a hop count;
    setting a first destination Ethernet address field to be equal to the Ethernet address of the first network device;
    setting a first source Ethernet address field to be equal to the Ethernet address of a second network device;
    transmitting from the second network device a data packet containing the hop count, the first destination Ethernet address, and the first source Ethernet address to adjacent network devices; and
    receiving at the second network device a reply data packet containing a second destination Ethernet address corresponding to the Ethernet address of the second network device and a second source Ethernet address corresponding to the Ethernet address of one of the adjacent network devices.

6. The method in accordance with claim 5, wherein if the second source Ethernet address in the reply data packet is not equal to the Ethernet address of the first network device, the hop count is modified and said transmitting and said receiving are repeated, wherein the second source Ethernet address corresponds to an Ethernet address of a network device sending the reply data packet.

7. The method in accordance with claim 1, wherein the network device is a LAN switch.

8. The method in accordance with claim 3, wherein the first network device is a LAN switch.

9. The method in accordance with claim 3, wherein the second network device is a LAN switch.

10. The method in accordance with claim 3, wherein the third network device is a LAN switch.

11. The method in accordance with claim 5, wherein the first network device is a LAN switch.

12. The method in accordance with claim 5, wherein the second network device is a LAN switch.

13. The method in accordance with claim 1, wherein the reply data packet includes:
    a destination Ethernet address corresponding to the second network address; and
    a source Ethernet address corresponding to the network device transmitting the reply data packet.

14. The method in accordance with claim 1, further comprising: repeating said receiving, said decrementing, said determining, and said forwarding until the hop count in the data packet received at a network device becomes one.

15. The method in accordance with claim 1, wherein said determining includes:
  looking up an address table maintaining an association between Ethernet addresses and corresponding ports on the network device.

16. The method in accordance with claim 1, wherein the modified data packet is forwarded through all of the ports on the network device if the destination Ethernet address is unknown.

17. The method in accordance with claim 1, wherein the data packet is included in a data field of an Ethernet frame.

18. A method for detecting the path to a desired network device, said method comprising:
  setting a hop count at an initial value;
  generating a probe data packet containing the hop count, a destination Ethernet address corresponding to the desired network device, and a source Ethernet address corresponding to a source network device sending the probe data packet;
  transmitting the probe data packet;
  receiving a reply data packet from a network device which received the probe data packet containing the hop count one, the reply data packet containing a reply destination Ethernet address corresponding to the source network device and a reply source Ethernet address corresponding to the network device sending the reply data packet;
  determining if the reply source Ethernet address is the same as the destination Ethernet address of the desired network device;
  incrementing the hop count by one if the reply source Ethernet address is different from the destination Ethernet address of the desired network device; and
  repeating said generating, said transmitting, said receiving, said determining, and said incrementing, until receiving a reply data packet containing a reply source Ethernet address which is the same as the destination Ethernet address of the desired network device.

19. The method in accordance with claim 18, wherein the initial value is one.

20. The method in accordance with claim 18, wherein a network device receiving the probe data packet decrements the hop count by one before forwarding the probe data packet to another network device.

21. The method in accordance with claim 18, further comprising: storing information of the network device from which the reply data packet is received.

22. An apparatus for detecting the path to a first network device, said apparatus comprising:
  means for receiving a data packet from a second network device, the data packet containing a hop count, a destination Ethernet address corresponding to the first network device, and a source Ethernet address corresponding to the second network device;
  means for examining the hop count in the received data packet;
  means for transmitting a reply data packet toward the source Ethernet address if the received hop count is one;
  means for decrementing the hop count by one to form a modified data packet if the hop count is greater than one;
  means for determining at least one port on a network device receiving the data packet, by examining the destination Ethernet address; and
  means for forwarding the modified data packet through the at least one port.

23. The apparatus in accordance with claim 22, wherein the modified data packet is not forwarded if the destination Ethernet address is the same as the Ethernet address of the network device receiving the data packet.

24. The apparatus in accordance with claim 22, wherein the reply data packet includes:
  a destination Ethernet address corresponding to the second network address; and
  a source Ethernet address corresponding to the network device transmitting the reply data packet.

25. The apparatus in accordance with claim 22, further comprising:
  means for repeating said receiving, said decrementing, said determining, and said forwarding until the hop count in the data packet received at a network device becomes one.

26. The apparatus in accordance with claim 22, wherein said means for determining includes:
  means for looking up an address table maintaining an association between Ethernet addresses and corresponding ports on the network device.

27. The apparatus in accordance with claim 22, wherein the modified data packet is forwarded through all of the ports on the network device if the destination Ethernet address is unknown.

28. The apparatus in accordance with claim 22, wherein the data packet is included in a data field of an Ethernet frame.

29. An apparatus for detecting the path to a desired network device, said apparatus comprising:
  means for setting a hop count at an initial value;
  means for generating a probe data packet containing the hop count, a destination Ethernet address corresponding to the desired network device, and a source Ethernet address corresponding to a source network device sending the probe data packet;
  means for transmitting the probe data packet;
  means for receiving a reply data packet from a network device which received the probe data packet containing the hop count one, the reply data packet containing a reply destination Ethernet address corresponding to the source network device and a reply source Ethernet address corresponding to the network device sending the reply data packet;
  means for determining if the reply source Ethernet address is the same as the destination Ethernet address of the desired network device;
  means for incrementing the hop count by one if the reply source Ethernet address is different from the destination Ethernet address of the desired network device; and
  means for repeating said generating, said transmitting, said receiving, said determining, and said incrementing, until receiving a reply data packet containing a reply source Ethernet address which is the same as the destination Ethernet address of the desired network device.

30. The apparatus in accordance with claim 29, wherein the initial value is one.

31. The apparatus in accordance with claim 29, wherein a network device receiving the probe data packet decrements the hop count by one before forwarding the probe data packet to another network device.

32. The apparatus in accordance with claim 29, further comprising:

means for storing information of the network device from which the reply data packet is received.

33. A program storage device readable by a machine, tangibly embodying a program of instructions executable by the machine to perform a method for detecting the path to a desired network device, said method comprising:

setting a hop count at an initial value;

generating a probe data packet containing the hop count, a destination Ethernet address corresponding to the desired network device, and a source Ethernet address corresponding to a source network device sending the probe data packet;

transmitting the probe data packet;

receiving a reply data packet from a network device which received the probe data packet containing the hop count one, the reply data packet containing a reply destination Ethernet address corresponding to the source network device and a reply source Ethernet address corresponding to the network device sending the reply data packet;

determining if the reply source Ethernet address is the same as the destination Ethernet address of the desired network device;

incrementing the hop count by one if the reply source Ethernet address is different from the destination Ethernet address of the desired network device; and repeating said generating, said transmitting, said receiving, said determining, and said incrementing, until receiving a reply data packet containing a reply source Ethernet address which is the same as the destination Ethernet address of the desired network device.

34. The method in accordance with claim 5, further comprising:

receiving the data packet at a third network device;

decrementing the hop count by one to form a modified data packet;

determining at least one port on the third network device by examining the first destination Ethernet address; and forwarding the modified data packet from the third network device through the at least one port.

35. The method in accordance with claim 34, wherein the modified data packet is not forwarded if the first destination Ethernet address is the same as the Ethernet address of the third network device.

36. The method in accordance with claim 34, further comprising:

examining the hop count in the received data packet; and transmitting a reply data packet toward the first source Ethernet address if the received hop count is one.

37. The method in accordance with claim 36, wherein the reply data packet includes:

a destination Ethernet address corresponding to the second network address; and a source Ethernet address corresponding to the third network device.

38. The method in accordance with claim 34, further comprising:

repeating said receiving, said decrementing the hop count, said determining at least one port, and said forwarding until the hop count in the data packet received at a third network device becomes one.

39. The method in accordance with claim 34, wherein said determining at least one port includes:

looking up an address table maintaining an association between Ethernet addresses and corresponding ports on the third network device.

40. The method in accordance with claim 34, wherein the modified data packet is forwarded through all of the ports on the third network device if the destination Ethernet address is unknown.

41. The method in accordance with claim 34, wherein the data packet is included in a data field of an Ethernet frame.

42. The method in accordance with claim 5, wherein the hop count is initialized to an initial value of one.

43. The method in accordance with claim 6, wherein the hop count is modified by incrementing the hop count by one.

44. The method in accordance with claim 6, wherein a network device receiving the data packet decrements the hop count by one before forwarding the data packet to another network device.

45. The method in accordance with claim 6, further comprising:

storing information of the network device from which the reply data packet is received.

46. An apparatus for detecting a path to a first network device, said apparatus comprising:

means for initializing a hop count;

means for setting a first destination Ethernet address field to be equal to the Ethernet address of the first network device;

means for setting a first source Ethernet address field to be equal to the Ethernet address of a second network device;

means for transmitting from the second network device a data packet containing the hop count, the first destination Ethernet address, and the first source Ethernet address to adjacent network devices; and means for receiving at the second network device a reply data packet containing a second destination Ethernet address corresponding to the Ethernet address of the second network device and a second source Ethernet address corresponding to the Ethernet address of one of the adjacent network devices.

47. The apparatus in accordance with claim 46, further comprising:

means for modifying the hop count if the second source Ethernet address in the reply data packet is not equal to the Ethernet address of the first network device; and means for repeatedly performing said means for transmitting and said means for receiving, wherein the second source Ethernet address corresponds to an Ethernet address of a network device sending the reply data packet.

48. A program storage device readable by a machine, tangibly embodying a program of instructions executable by the machine to perform a method for detecting a path to a first network device, said method comprising:

initializing a hop count;

setting a first destination Ethernet address field to be equal to the Ethernet address of the first network device;

setting a first source Ethernet address field to be equal to the Ethernet address of a second network device;

transmitting from the second network device a data packet containing the hop count, the first destination Ethernet address, and the first source Ethernet address to adjacent network devices; and receiving at the second network device a reply data packet containing a second destination Ethernet address corresponding to the Ethernet address of the second network device and a second source Ethernet address corresponding to the Ethernet address of one of the adjacent network devices.

49. An apparatus for detecting the path to a first network device, said apparatus comprising:
an interface adapted to receive a data packet from a second network device, the data packet containing a hop count, a destination Ethernet address corresponding to the first network device, and a source Ethernet address corresponding to the second network device;
discovery protocol logic coupled to said interface, adapted to examine the hop count in the received data packet, decrement the hop count by one to form a modified data packet if the received hop count is greater than one, and transmit a reply data packet through said interface toward the source Ethernet address if the received hop count is one; and
forwarding logic adapted to determine at least one port on said interface by examining the destination Ethernet address, and forward the modified data packet through the at least one port.

50. The apparatus in accordance with claim 49, wherein said forwarding logic does not forward the modified data packet if the destination Ethernet address is the same as the Ethernet address of a network device on which said apparatus is provided.

51. The apparatus in accordance with claim 50, wherein the reply data packet includes:
a destination Ethernet address corresponding to the second network address; and
a source Ethernet address corresponding to the network device transmitting the reply data packet.

52. The apparatus in accordance with claim 50, further comprising:
an address table maintaining an association between Ethernet addresses and corresponding ports on the network device.

53. The apparatus in accordance with claim 50, wherein the modified data packet is forwarded through all of the ports on said interface if the destination Ethernet address is unknown.

54. A apparatus for detecting a path to a first network device, said apparatus comprising:
discovery protocol logic adapted to set a hop count at an initial value and generate a probe data packet containing the hop count, a destination Ethernet address corresponding to the desired network device, and a source Ethernet address corresponding to a source network device sending the probe data packet; and
an interface adapted to transmit the probe data packet and receive a reply data packet from a network device which received the probe data packet containing the hop count one, the reply data packet containing a reply destination Ethernet address corresponding to the source network device and a reply source Ethernet address corresponding to the network device sending the reply data packet,
wherein said discovery protocol logic determines if the reply source Ethernet address is the: same as the destination Ethernet address of the desired network device, generates a second probe packet by increments the hop count by one if the reply source Ethernet address is different from the destination Ethernet address of the desired network device, and transmits the second probe packet through said interface until receiving a reply data packet containing a reply source Ethernet address which is the same as the destination Ethernet address of the desired network device.

55. The apparatus in accordance with claim 54, wherein the initial value is one.

56. The apparatus in accordance with claim 54, further comprising a memory adapted to store information of the network device from which the reply data packet is received.

57. A method for detecting a path to a first network device, said method comprising:
initializing a hop count;
setting a first destination Ethernet address field to be equal to the Ethernet address of the first network device;
setting a first source Ethernet address field to be equal to the Ethernet address of a second network device;
transmitting from the second network device a data packet containing the hop count, the first destination Ethernet address, and the first source Ethernet address to adjacent network devices;
receiving at the second network device a reply data packet containing a second destination Ethernet address corresponding to the Ethernet address of the second network device and a second source Ethernet address corresponding to the Ethernet address of one of the adjacent network devices;
receiving the data packet at a third network device;
decrementing the hop count by one to form a modified data packet;
determining at least one port on the third network device by examining the first destination Ethernet address; and
forwarding the modified data packet from the third network device through the at least one port.

58. The method in accordance with claim 57, wherein the modified data packet is not forwarded if the first destination Ethernet address is the same as the Ethernet address of the third network device.

59. The method in accordance with claim 57, further comprising:
examining the hop count in the received data packet; and
transmitting a reply data packet toward the first source Ethernet address if the received hop count is one.

60. The method in accordance with claim 59, wherein the reply data packet includes:
a destination Ethernet address corresponding to the second network address; and
a source Ethernet address corresponding to the third network device.

61. The method in accordance with claim 57, further comprising:
repeating said receiving, said decrementing the hop count, said determining at least one port, and said forwarding until the hop count in the data packet received at a third network device becomes one.

62. The method in accordance with claim 57, wherein said determining at least one port includes looking up an address table maintaining an association between Ethernet addresses and corresponding ports on the third network device.

63. The method in accordance with claim 57, wherein the modified data packet is forwarded through all of the ports on the third network device if the destination Ethernet address is unknown.

64. The method in accordance with claim 57, wherein the data packet is included in a data field of an Ethernet frame.

65. A method for detecting a path to a first network device, said method comprising:

initializing a hop count to a value of one;

setting a first destination Ethernet address field to be equal to the Ethernet address of the first network device;

setting a first source Ethernet address field to be equal to the Ethernet address of a second network device;

transmitting from the second network device a data packet containing the hop count, the first destination Ethernet address, and the first source Ethernet address to adjacent network devices; and receiving at the second network device a reply data packet containing a second destination Ethernet address corresponding to the Ethernet address of the second network device and a second source Ethernet address corresponding to the Ethernet address of one of the adjacent network devices.

66. The program storage device in accordance with claim 48, wherein if the second source Ethernet address in the reply data packet is not equal to the Ethernet address of the first network device, the hop count is modified and said transmitting and said receiving are repeated, wherein the second source Ethernet address corresponds to an Ethernet address of a network device sending the reply data packet.

67. The program storage device in accordance with claim 66, wherein the hop count is modified by incrementing the hop count by one.

68. The program storage device in accordance with claim 66, wherein a network device. receiving the data packet decrements the hop count by one before forwarding the data packet to another network device.

69. The program storage device in accordance with claim 66, said method further comprising:

storing information of the network device from which the reply data packet is received.

70. The program storage device in accordance with claim 48, wherein the first network device is a LAN switch.

71. The program storage device in accordance with claim 48, wherein the second network device is a LAN switch.

72. The program storage device in accordance with claim 48, said method further comprising:

receiving the data packet at a third network device;

decrementing the hop count by one to form a modified data packet;

determining at least one port on the third network device by examining the first destination Ethernet address; and forwarding the modified data packet from the third network device through the at least one port.

73. The program storage device in accordance with claim 72, wherein the modified data packet is not forwarded if the first destination Ethernet address is the same as the Ethernet address of the third network device.

74. The program storage device in accordance with claim 72, said method further comprising:

examining the hop count in the received data packet; and transmitting a reply data packet toward the first source Ethernet address if the received hop count is one.

75. The program storage device in accordance with claim 74, wherein the reply data packet includes:

a destination Ethernet address corresponding to the second network address; and a source Ethernet address corresponding to the third network device.

76. The program storage device in accordance with claim 72, said method further comprising:

repeating said receiving, said decrementing the hop count, said determining at least one port, and said forwarding until the hop count in the data packet received at a third network device becomes one.

77. The program storage device in accordance with claim 72, wherein said determining at least one port includes looking up an address table maintaining an association between Ethernet addresses and corresponding ports on the third network device.

78. The program storage device in accordance with claim 72, wherein the modified data packet is forwarded through all of the ports on the third network device if the destination Ethernet address is unknown.

79. The program storage device in accordance with claim 72, wherein the data packet is included in a data field of an Ethernet frame.

80. The program storage device in accordance with claim 48, wherein the hop count is initialized to an initial value of one.

81. The apparatus in accordance with claim 47, wherein the means for modifying the hop count further comprises means for modifying the hop count by incrementing the hop count by one.

82. The apparatus in accordance with claim 47, wherein a network device receiving the data packet decrements the hop count by one before forwarding the data packet to another network device.

83. The apparatus in accordance with claim 47, further comprising means for storing information of the network device from which the reply data packet is received.

84. The apparatus in accordance with claim 46, wherein the first network device is a LAN switch.

85. The apparatus in accordance with claim 46, wherein the second network device is a LAN switch.

86. The apparatus in accordance with claim 46, further comprising:

means for receiving the data packet at a third network device;

means for decrementing the hop count by one to form a modified data packet;

means for determining at least one port on the third network device by examining the first destination Ethernet address; and means for forwarding the modified data packet from the third network device through the at least one port.

87. The apparatus in accordance with claim 86, wherein the modified data packet is not forwarded if the first destination Ethernet address is the same as the Ethernet address of the third network device.

88. The apparatus in accordance with claim 86, further comprising:

means for examining the hop count in the received data packet; and means for transmitting a reply data packet toward the first source Ethernet address if the received hop count is one.

89. The apparatus in accordance with claim 88, wherein the reply data packet includes:

a destination Ethernet address corresponding to the second network address; and a source Ethernet address corresponding to the third network device.

90. The apparatus in accordance with claim 86, further comprising:
means for repeating said receiving, said decrementing the hop count, said determining at
least one port, and said forwarding until the hop count in the data packet received at a third network device becomes one.

91. The apparatus in accordance with claim 86, wherein said means for determining at least one port includes means for looking up an address table maintaining an association between Ethernet addresses and corresponding ports on the third network device.

92. The apparatus in accordance with claim 86, wherein the modified data packet is forwarded through all of the ports on the third network device if the destination Ethernet address is unknown.

93. The apparatus in accordance with claim 86, wherein the data packet is included in a data field of an Ethernet frame.

94. The apparatus in accordance with claim 46, wherein the hop count is initialized to an initial value of one.

95. An apparatus for detecting a path to a first network device, said apparatus comprising:
discovery protocol logic adapted to:
  initialize a hop count;
  set a first destination Ethernet address field to be equal to the Ethernet address of the first network device; and
  set a first source Ethernet address field to be equal to the Ethernet address of a second network device; and
an interface adapted to:
  transmit from the second network device a data packet containing the hop count, the first destination Ethernet address, and the first source Ethernet address to adjacent network devices; and
  receive at the second network device a reply data packet containing a second destination Ethernet address corresponding to the Ethernet address of the second network device and a second source Ethernet address corresponding to the Ethernet address of one of the adjacent network devices.

96. The apparatus in accordance with claim 95, wherein said apparatus is further adapted to modify the hop count and repeat the receiving if the second source Ethernet address in the reply data packet is not equal to the Ethernet address of the first network device, wherein the second source Ethernet address corresponds to an Ethernet address of a network device sending the reply data packet.

97. The apparatus in accordance with claim 96, wherein said apparatus is further adapted to modify the hop count by incrementing the hop count by one.

98. The apparatus in accordance with claim 96, wherein a network device receiving the data packet decrements the hop count by one before forwarding the data packet to another network device.

99. The apparatus in accordance with claim 96, said apparatus further adapted to store information of the network device from which the reply data packet is received.

100. The apparatus in accordance with claim 95, wherein the first network device is a LAN switch.

101. The apparatus in accordance with claim 95, wherein the second network device is a LAN switch.

102. The apparatus in accordance with claim 95, said apparatus further adapted to:
receive the data packet at a third network device;
decrement the hop count by one to form a modified data packet;
determine at least one port on the third network device by examining the first destination Ethernet address; and
forward the modified data packet from the third network device through the at least one port.

103. The apparatus in accordance with claim 102, wherein the modified data packet is not forwarded if the first destination Ethernet address is the same as the Ethernet address of the third network device.

104. The apparatus in accordance with claim 102, said apparatus further adapted to:
examine the hop count in the received data packet; and
transmit a reply data packet toward the first source Ethernet address if the received hop count is one.

105. The apparatus in accordance with claim 104, wherein the reply data packet includes:
a destination Ethernet address corresponding to the second network address; and
a source Ethernet address corresponding to the third network device.

106. The apparatus in accordance with claim 102, said apparatus further adapted to repeat said receiving, said decrementing the hop count, said determining at least one port, and said forwarding until the hop count in the data packet received at a third network device becomes one.

107. The apparatus in accordance with claim 102, wherein said apparatus is further adapted to determine at least one port by looking up an address table maintaining an association between Ethernet addresses and corresponding ports on the third network device.

108. The apparatus in accordance with claim 102, wherein said apparatus is further adapted to forward the modified data packet through all of the ports on the third network device if the destination Ethernet address is unknown.

109. The apparatus in accordance with claim 102, wherein the data packet is included in a data field of an Ethernet frame.

110. The apparatus in accordance with claim 95, wherein said apparatus is further adapted to initialize the hop count to a value of one.

111. A program storage device readable by a machine, tangibly embodying a program of instructions executable by the machine to perform a method for for detecting a path to a first network device, the method comprising:
transmitting from a second network device, the data packet containing a hop count, a destination Ethernet address corresponding to the first network device, and a source Ethernet address corresponding to the second network device;
receiving the data packet at a third network device;
examining the hop count in the received data packet;
if the hop count is one, transmitting a reply data packet toward the source Ethernet address;
if the hop count is greater than one, decrementing the hop count by one to form a modified data packet;
determining at least one port on the third network device by examining the destination Ethernet address; and
forwarding the modified data packet from the third network device through the at least one port.

112. The program storage device in accordance with claim 111, wherein the first network device is a LAN switch.

113. The program storage device in accordance with claim 111, wherein the second network device is a LAN switch.

114. The program storage device in accordance with claim 111, wherein the third network device is a LAN switch.

115. An apparatus for detecting a path to a first network device, the apparatus comprising:

means for transmitting from a second network device, the data packet containing a hop count, a destination Ethernet address corresponding to the first network device, and a source Ethernet address corresponding to the second network device;

means for receiving the data packet at a third network device;

means for examining the hop count in the received data packet;

means for, if the hop count is one, transmitting a reply data packet toward the source Ethernet address;

means for, if the hop count is greater than one, decrementing the hop count by one to form a modified data packet;

means for determining at least one port on the third network device by examining the destination Ethernet address; and means for forwarding the modified data packet from the third network device through the at least one port.

116. The apparatus in accordance with claim 115, wherein the first network device is a LAN switch.

117. The apparatus in accordance with claim 115, wherein the second network device is a LAN switch.

118. The apparatus in accordance with claim 115, wherein the third network device is a LAN switch.

* * * * *